(12) United States Patent
Scudder et al.

(10) Patent No.: US 12,221,264 B1
(45) Date of Patent: Feb. 11, 2025

(54) TERPENE PRESERVATION SYSTEM AND METHOD

(71) Applicants: Charles Michael Scudder, Westminster, CO (US); Christopher A. Heck, Jacksonville, FL (US)

(72) Inventors: Charles Michael Scudder, Westminster, CO (US); Christopher A. Heck, Jacksonville, FL (US)

( * ) Notice: Subject to any disclaimer, the term of this patent is extended or adjusted under 35 U.S.C. 154(b) by 0 days.

(21) Appl. No.: 18/586,068

(22) Filed: Feb. 23, 2024

Related U.S. Application Data

(60) Provisional application No. 63/447,711, filed on Feb. 23, 2023.

(51) Int. Cl.
*B65D 81/20* (2006.01)
*B65D 81/24* (2006.01)

(52) U.S. Cl.
CPC ......... *B65D 81/2076* (2013.01); *B65D 81/24* (2013.01)

(58) Field of Classification Search
CPC .............................. B65D 81/00–24
See application file for complete search history.

(56) References Cited

U.S. PATENT DOCUMENTS

| | | | | |
|---|---|---|---|---|
| 4,256,770 | A * | 3/1981 | Rainey | A23B 7/148 426/419 |
| 6,446,794 | B1 * | 9/2002 | Hacikyan | B65D 75/26 206/524.2 |
| 7,870,953 | B2 | 1/2011 | Tanbo et al. | |
| 10,737,198 | B2 | 8/2020 | Lombardi | |
| 11,346,051 | B2 | 5/2022 | Luxenbourg et al. | |
| 11,412,766 | B2 | 8/2022 | Glorioso et al. | |
| 2012/0073590 | A1 * | 3/2012 | Kawata | A24B 13/00 131/352 |
| 2012/0085360 | A1 * | 4/2012 | Kawata | B65D 43/164 131/352 |
| 2014/0026912 | A1 * | 1/2014 | Rushforth | A24B 13/00 131/352 |
| 2014/0069829 | A1 * | 3/2014 | Evans | A24F 23/02 206/265 |
| 2016/0073680 | A1 * | 3/2016 | Rushforth | B65D 81/2076 131/300 |
| 2018/0007957 | A1 | 1/2018 | Rushforth et al. | |

(Continued)

OTHER PUBLICATIONS

"Terpifuse Bucket System," theterpenestore.com. https://theterpenestore.com/terpifuse-bucket-system/ [Date accessed: Oct. 20, 2022].

(Continued)

*Primary Examiner* — Kareen K Thomas
(74) *Attorney, Agent, or Firm* — Bold IP PLLC; Christopher Mayle

(57) ABSTRACT

A system and method for a terpene delivery vessel device designed to infuse and protect terpene content without liquid terpenes directly contacting dried plant materials (the product). The device keeps naturally present terpenes from escaping the product as well as promotes the infusion of non-native terpenes into the product which enhances flavor. The system invention preserves terpenes present and replaces missing terpenes which have escaped from the product whereby with the correct formula of terpenes, a balance can be achieved and additional terpenes can also be infused to enhance the product's flavor and effects.

9 Claims, 1 Drawing Sheet

(56) References Cited

U.S. PATENT DOCUMENTS

| | | |
|---|---|---|
| 2019/0039803 A1 | 2/2019 | Greenbaum |
| 2021/0171240 A1 | 6/2021 | Schneider |
| 2021/0171268 A1 | 6/2021 | Schneider |
| 2021/0294423 A1 | 9/2021 | Cowen et al. |
| 2021/0352958 A1 | 11/2021 | Pandolfino |
| 2022/0356089 A1* | 11/2022 | Sayre .................. C02F 1/686 |

OTHER PUBLICATIONS

"TerpSafe Closures," ebottles.com. https://www.ebottles.com/collections/all [Date accessed: Oct. 20, 2022].

"Integra Boost® Terpene Essentials," integra-products.com. https://integra-products.com/pages/terpene-essentials [Date accessed: Oct. 20, 2022].

\* cited by examiner

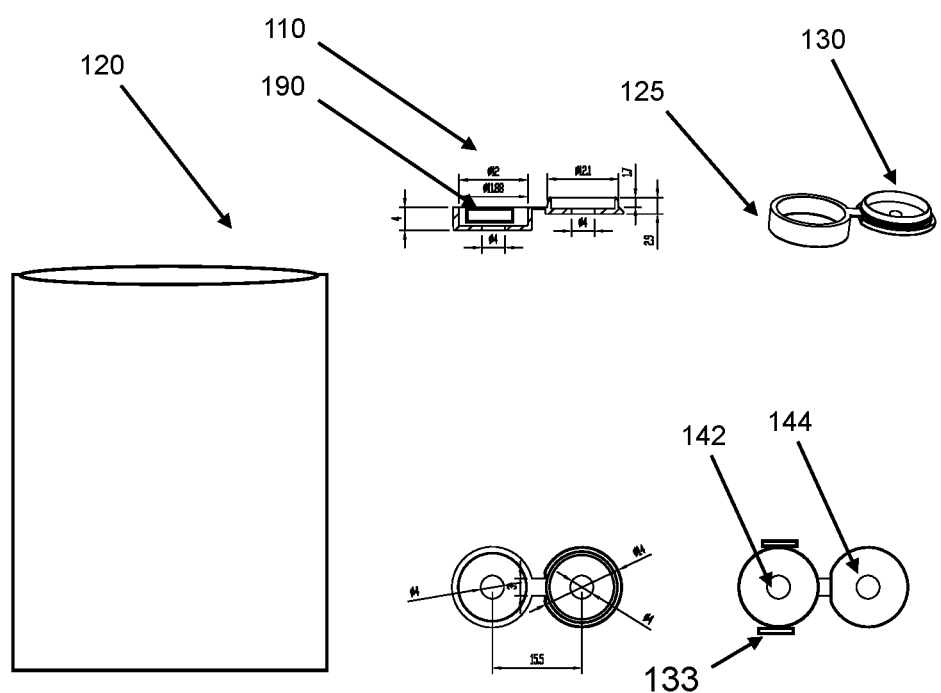

TERPENE PRESERVATION SYSTEM AND METHOD

CROSS REFERENCE TO RELATED APPLICATIONS

This application claims priority to U.S. Provisional Patent Application No. 63/447,711 filed on Feb. 23, 2023 and is incorporated in its entirety.

FIELD OF THE DISCLOSURE

The present invention relates generally to the infusion and preservation of terpenes in plant-based materials (the product). In particular, a container containing organic terpenes will keep the naturally inherent terpenes from escaping the product as well as creating a positive partial pressure terpene environment infusing organic terpenes into the product. An equilibrium of terpenes will be achieved to maintain the native terpenes present within the product.

BACKGROUND

Terpenes are volatile organic compounds which contribute to the pharmacology, efficacy, aroma, and flavor of the dried plant material including but not limited to Sativa L products. Because terpenes are so volatile, the product gradually loses terpene content from the moment it is harvested.

Because terpenes are inherently volatile molecules, as the product ages, loss will occur. Every time the consumer opens a package containing the product, terpene content evaporates and escapes the product and package. Each repeated opening and closing of a package containing the product results in ongoing terpene loss and a decrease in quality, freshness, and terpene efficacy. A pod will prevent this continuous terpene loss.

The present invention creates a microenvironment (headspace) of positive pressure within the package containing the product occupied by the organic terpenes from our system, resulting in the preservation and infusion of terpenes within the product. As the product ages in the packaging, terpenes originating from the product will evaporate and occupy the head space inside the package until an equilibrium is created between terpene content in the headspace and the product. The invention diffuses terpenes from the pod into the headspace and infuses the product. The introduction of terpenes from our pods into the headspace of the package allows terpene infusion to occur as well as inherent terpenes from the product to remain within the plant's structure and not migrate into the headspace of the package. The result is the preservation of inherent terpenes as well as infusion of the Pod's organic terpenes.

SUMMARY

The present invention describes a system and method for a terpene delivery vessel device (Pod) designed to infuse and protect terpene content in dried materials without direct contact with the product. The invention is designed to be a terpene source for infusion and preservation within the container via non-direct contact with the product. The pod keeps the naturally present terpenes from escaping the product and enhances the product's flavor and specific effects from terpene blends. Dry materials may have up to 4% total terpene content which quickly deteriorates until properly packaged. The present invention is designed to replace these missing terpenes as well as introduce non-native terpenes. With the correct formula of terpenes, a balance can be achieved. Additional terpenes can also be introduced to enhance the product's flavor and effects.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

FIG. 1 illustrates the components of the terpene infusion system.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains.

In the case of conflict, the present document, including definitions, will control. It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention.

FIG. 1 is an illustration of terpene infusion and preservation system 100. Terpene infusion and preservation system 100 may include any pod or non-direct contact delivery vessel device component 110 that is placed inside of a container 120. Pod component 110 may be any shape and size depending on the need and use such as disc or puck shaped. Container 120 may be any type of storage device or package such as but not limited to a jar, cup, bottle, mylar bags, product packing, or other container suited to hold dried material such as herbs. Container 120 in some embodiments may have a cylindrical body with a twistable top, screw on top, or any type of connection that may be opened or removed from the cylindrical body so that items such as matchsticks may be stored inside of the cylindrical body.

The pod component 110 may include a top and bottom component as a hollow body portion 125 and a Snap-On lid 130 both being molded of a suitable flexible and resilient plastic material, such as ethylene-based octene-1 plastomer produced through a solution polymerization process using a metallocene catalyst. This provides a material with toughness, puncture resistance, and low-temperature impact strength. The body portion 125 may be of any configuration and includes a base at the bottom and a cylindrical sidewall that extends upward of the base. The cylindrical sidewall extends upward to a neck. The neck serves as the mouth of the container to receive the lid 130.

A bead may be formed peripherally about a medial portion of the neck and acts as a detent for engaging a complementary groove formed on the interior wall of the cap. The body portion 125 may have single opening 142 at the base whereby medium 190 (paper or any other suitable material) infused with terpene will rest over and upon the base. Similarly, the lid 130 may have a single opening 144 that is aligned vertically with the hole 142 in the base. The dual hole system has been proven to be an improved configuration for infusion from medium 190 while not allowing direct contact of terpenes to the product because opening 142 is directly below medium 190 while medium 190 directly rests on it allowing for a bigger opening and the terpenes also simultaneously travel directly upward to hole 144. In alternate embodiments there may be a plurality of holes or a mesh of holes in any number of arrangements and sizes.

The lid 130 includes a central disk portion having a skirt or flange portion extending entirely thereabout. The perimeter of the skirt is smaller than the circumference of the cylindrical sidewall so that the outer margin of the cylindrical sidewall always extends beyond the periphery of the skirt. The under edge of the lid 130 is preferably flat to make surface to surface abutment with the flat face of the shoulder thereby normally defining an extremely fine line about the entire area of contact. Thus, when the lid 130 is snapped over the neck there is ordinarily no gap between the cylindrical sidewall and the skirt which is readily engaged for lifting the lid.

The body portion 125 may be shaped to receive medium 190 infused with a terpene blend which matches the natural terpenes present in a specific product's strain or dried materials or other combustible material that is to be placed into container 120. In further embodiments there may be two baskets or two slots in body portion 125 for receiving different medium 190s infused with terpene blends to increase results. One or more pods having a second medium 190 for enhanced effects may also be connected to one another in a stacked formation with an inner groove on the top of a pod betting fitted over by a bottom of a pod that is positioned above it and secured by a friction fit or daisy chain formation or other pattern by one or more connectors 133 at an edge of the pods.

During use, the terpene infused matrix inside pod component 110 fills container 120 via the openings on pod component 110 and establishes a balance between the terpenes in the dried material and the terpenes in the head space without liquid terpene contacting the product directly. The terpenes work together to create an equilibrium which keeps the native terpenes from escaping the dried material. The result is the preservation of inherent terpenes plus infusion of the container's non-native terpenes into the product.

Pod component 110 may have a strain matching specific terpene blend intended to compliment the customer's native terpene profile whereby a customer could choose to use a terpene blend with a focus on a specific flavor. For instance, it could be lemon, citrus, berry etc.

Here are some example terpenes (but not limited to) that may be infused into medium 190: -alpha-Bisabol 23089-26-1 (+)-Borneol 464-43-7 Camphene 79-92-5 (−)-Borneol 464-45-9 Camphor 76-22-2 (R)-(+)-Camphor 464-49-3 (1S)-3-(+)-Carene 498-15-7 (S)-(−)-Camphor 464-48-2 trans-Caryophyllene 87-44-5 alpha-Cedrene 469-61-4 (−)-Caryophyllene-oxide 1139-30-6 Endo Fenchyl Alcohol 2217 Feb. 9 (+)-Cedrol 77-53-2 (L)-(−)-Fenchone 7787-20-4 Eucalyptol 470-82-6 Geraniol 106-24-1 Farnesene 502-61-4 (−)-Guaiol 489-86-1 (+)-Fenchone 4695-62-9 alpha-Humulene 6753-98-6 Geranyl Acetate 105-87-3 (R)-(+)-Limonene 5989-27-5 Hexahydro thymol 89-78-1 trans-Nerolidol 40716-66-3 Isoborneol 124-76-5 alpha-Pinene 80-56-8 (−)-Isoeugenol 89-79-2 beta-Pinene 127-91-3 Linalool 78-70-6 (+)-Pulegone 89-82-7 p-Mentha-1,5-diene 99-83-2 Sabine Hydrate 546-79-2 beta-Myrcene 123-35-3 Sabinene 3387-41-5 Nerol 106-25-2 alpha-Terpinene 99-86-5 cis-Nerolidol 3790-78-1 gamma-Terpinene 99-85-4 Ocimene 13877-91-3 Terpineol 8000-41-7 Valencene 4630-07-3 Terpinolene 586-62-9

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A terpene preservation and infusion system having a delivery vessel component placed into a container, the delivery vessel component holding a liquid terpene infused medium, wherein the delivery vessel component has a base and a lid connectable to the base, wherein the lid has a hole extending through the lid, wherein a bottom of the base has a hole extending through the base, wherein the hole of the lid and the hole of the base are vertically aligned.

2. The terpene preservation and infusion system of claim 1, wherein the liquid terpene infused medium is infused with gamma-Terpinene.

3. The terpene preservation and infusion system of claim 2, wherein the liquid terpene infused medium is infused with alpha-Humulene.

4. The terpene preservation and infusion system of claim 2, wherein the lid has a snap fit connection with the base.

5. The terpene preservation and infusion system of claim 1, wherein the delivery vessel component is made of an ethylene-based octene-1 plastomer.

6. The terpene preservation and infusion system of claim 1, wherein the delivery vessel component is stackable with a second delivery vessel component by a friction fit, the second delivery vessel component having a second liquid terpene infused medium.

7. The terpene preservation and infusion system of claim 1, wherein the delivery vessel component is connectable in a daisy chain formation with a second delivery vessel component wherein an inner groove on a top of the delivery vessel component is fitted over by a bottom of the second delivery vessel component that is positioned above it and secured by a friction fit, the second delivery vessel component having a second liquid terpene infused medium different from the liquid terpene infused medium.

8. A method for terpene preservation and infusion, the method comprising: placing combustible materials in a container;
   strain matching a specific terpene blend of the combustible materials intending to compliment a terpene profile;
   placing a terpene infused medium in response to the strain matching into a pod component;
   positioning the pod component into the container;
   providing a balance between the terpenes in the combustible materials and terpenes in the container without direct contact between liquid terpenes and product, wherein the terpenes in the container off-gas and migrate through holes in the pod component.

9. The method of claim 8 further comprising:
   placing a second terpene infused medium into a second pod component;
   connecting the second pod component to the pod component;
   positioning the second pod component into the container.

* * * * *